(12) United States Patent
Caira et al.

(10) Patent No.: US 11,221,243 B2
(45) Date of Patent: Jan. 11, 2022

(54) ONLINE INSTALLATION SYSTEM OF ULTRASONIC STEAM MEASUREMENT DEVICE

(71) Applicant: GE Infrastructure Sensing, LLC, Billerica, MA (US)

(72) Inventors: Jesse Aaron Caira, Billerica, MA (US); Lei Sui, Billerica, MA (US); James Edward Matson, Billerica, MA (US); Toan Huu Nguyen, Billerica, MA (US); Rachel Brielle Avioli, Medford, MA (US)

(73) Assignee: GE Infrastructure Sensing, LLC, Billerica, MA (US)

(*) Notice: Subject to any disclaimer, the term of this patent is extended or adjusted under 35 U.S.C. 154(b) by 305 days.

(21) Appl. No.: 16/360,635

(22) Filed: Mar. 21, 2019

(65) Prior Publication Data
US 2019/0293465 A1 Sep. 26, 2019

Related U.S. Application Data

(60) Provisional application No. 62/646,526, filed on Mar. 22, 2018.

(51) Int. Cl.
*G01F 1/66* (2006.01)
(52) U.S. Cl.
CPC .................... *G01F 1/662* (2013.01)
(58) Field of Classification Search
CPC ............................................ G01F 1/662
USPC ....................................................... 73/861.18
See application file for complete search history.

(56) References Cited

U.S. PATENT DOCUMENTS

| | | | |
|---|---|---|---|
| 5,106,580 A * | 4/1992 | Mudiam | G01N 17/00 422/53 |
| 5,515,733 A * | 5/1996 | Lynnworth | G01F 1/662 73/644 |
| 2015/0025414 A1* | 1/2015 | Rhad | A61B 90/17 600/567 |

* cited by examiner

*Primary Examiner* — Walter L Lindsay, Jr.
*Assistant Examiner* — Philipmarcus T Fadul
(74) *Attorney, Agent, or Firm* — Mintz Levin Cohn Ferris Glovsky and Popeo, P.C.

(57) ABSTRACT

Online installation systems and methods are provided for online installations of ultrasonic steam measurement devices in steam pipes. In one embodiment, a tool is provided and includes a transducer assembly configured to be coupled to a distal end of an isolation valve installed on a pressurized steam pipe. An ultrasonic transducer can be movably disposed within the transducer assembly, and the ultrasonic transducer can extend through a proximal opening of the transducer assembly and through a distal opening of the transducer assembly. The tool can also include an insertion mechanism configured to be coupled to a distal end of the transducer assembly and having a cylindrical housing at least partially enclosing the ultrasonic transducer. The insertion mechanism can include a linear actuator assembly configured to linearly actuate the ultrasonic transducer.

17 Claims, 12 Drawing Sheets

ONLINE INSTALLATION SYSTEM OF ULTRASONIC STEAM MEASUREMENT DEVICE

CROSS-REFERENCE TO RELATED APPLICATION

This application claims the benefit of priority to U.S. Provisional Patent Application No. 62/646,526, filed on Mar. 22, 2018 in the U.S. Patent and Trademark Office, the entire disclosure of which is incorporated herein by reference.

FIELD

Online installation systems and methods are provided for online installations of ultrasonic steam measurement devices in steam pipes.

BACKGROUND

Measuring the flow rate within steam pipes can be challenging due to the harsh environment inside the pipes. Steam flows at high temperatures and under high levels of pressure, creating a risk of injury whenever measurement devices are introduced to the pipes. For this reason, introducing a steam measurement device into the steam line without emptying or otherwise interrupting the line, a process known as "hot tapping," can be difficult, and at times, dangerous.

Conventionally, inserting a steam measurement device into a steam line can require shutting down and disassembling the piping in order to reduce the pressure and temperature inside the pipe. However, such a procedure can be time consuming and tedious.

Accordingly, there remains a need for improved methods and devices for installation of steam measurement devices in live, pressurized steam pipes.

SUMMARY

Methods and devices are provided for online installations of ultrasonic steam measurement devices in live, pressurized steam pipes. In one embodiment, a seal can be formed between a transducer assembly and an isolation valve installed on a steam pipe. In certain embodiments, the transducer assembly can include an ultrasonic transducer to measure characteristics of steam flowing inside the pipe. The transducer assembly can be installed to the steam pipe using an insertion mechanism that includes a linear actuator assembly. In certain embodiments, the linear actuator assembly can linearly translate the ultrasonic transducer so as to introduce the transducer into the steam line, without having to empty or otherwise depressurize the pipe.

In certain exemplary embodiments, the transducer assembly can couple to a distal end of an isolation valve installed on a pressurized steam pipe. An ultrasonic transducer can be movably disposed within the transducer assembly, the ultrasonic transducer extending through a proximal opening of the transducer assembly and extending through a distal opening of the transducer assembly. Further, an insertion mechanism can couple to a distal end of the transducer assembly. A cylindrical housing can at least partially enclose the ultrasonic transducer. The insertion mechanism can include a linear actuator assembly configured to linearly actuate the ultrasonic transducer.

BRIEF DESCRIPTION OF THE DRAWINGS

The embodiments herein may be better understood by referring to the following description in conjunction with the accompanying drawings in which like reference numerals indicate identically or functionally similar elements, of which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Measuring the flow rate within steam pipes can be challenging due to the harsh environment inside the pipes. Steam can flow at high temperatures and under high levels of pressure, creating a risk of injury whenever measurement devices are introduced to the pipes. Current techniques for installing a measurement device, such as a flowmeter, in some circumstances can either require the steam line to be shut down and disassembled in order to reduce the pressure and install the flowmeter, or require the flowmeter to be integrated into the steam line at the time that the steam line is initially built. Accordingly, an online installation system is provided that can install a measurement device into a "live," or pressurized, steam line, without the need to interrupt or shut down the line. Such installations are considered "online," as they are performed during operation of the steam line. In particular, the online installation system includes a transducer assembly to be installed in a steam line and an insertion mechanism used to install the transducer assembly. The ultrasonic transducer in the transducer assembly can be introduced into the existing steam pipe through an isolation valve attached thereto while steam is flowing through the pipe, a process known as "hot-tapping." As such, steam measurement devices can be introduced into a steam line retroactively without needing to empty the pipe or otherwise interrupt its operation.

Embodiments of an online installation system of an ultrasonic steam measurement device are discussed herein below.

Figure 1:
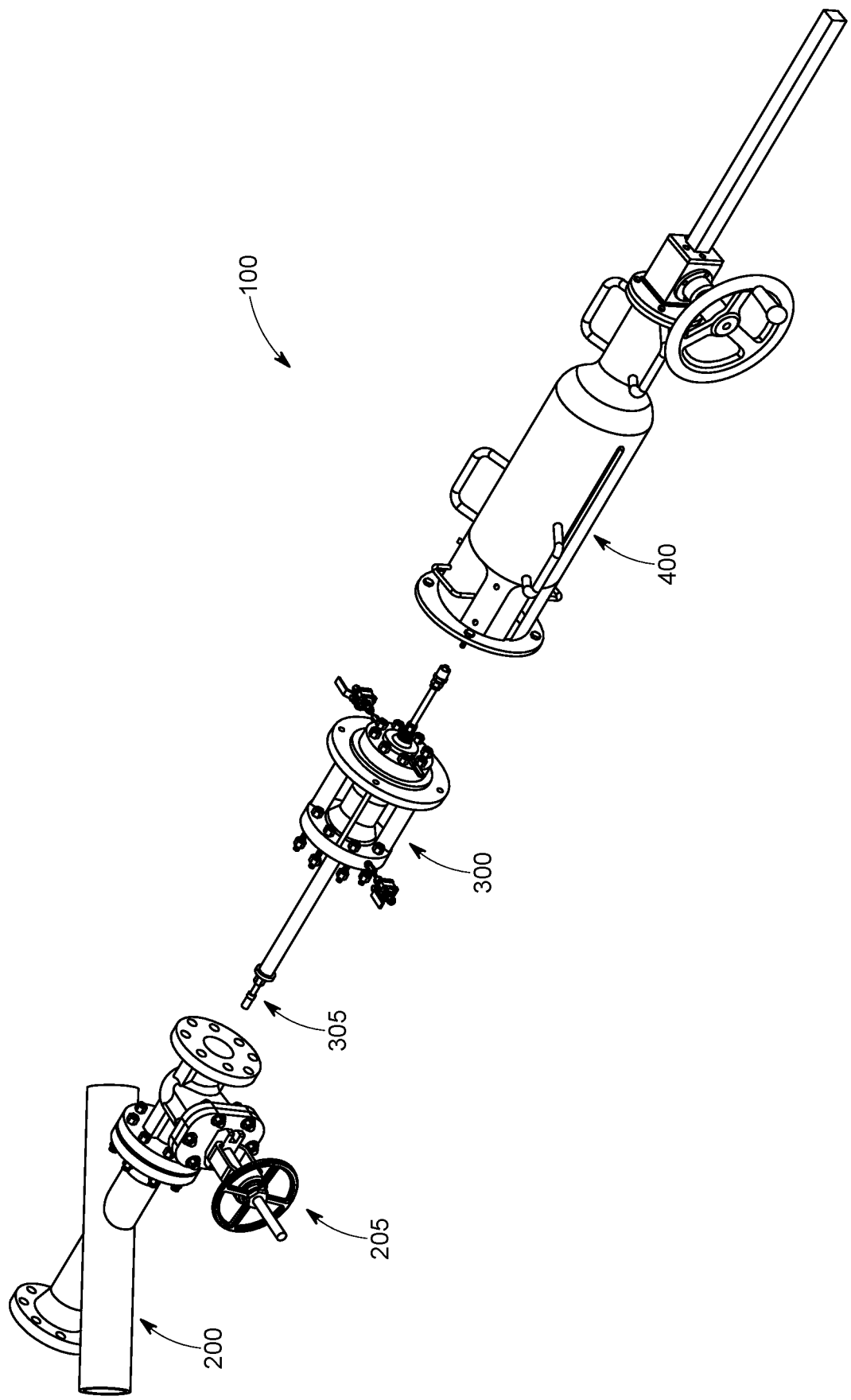
FIG. 1 is an exploded perspective view of a system for online installation of an ultrasonic steam measurement device in an existing steam pipe.

FIG. 1 illustrates one embodiment of a system 100 for online installation of an ultrasonic steam measurement device in an existing steam pipe 200. As shown, the online installation system 100 generally includes a transducer assembly 300 configured to be coupled to an insertion mechanism 400. The transducer assembly 300 and insertion mechanism 400 can be coupled to an existing steam pipe 200, and during operation, the insertion mechanism 400 can actuate an ultrasonic transducer 305 of the transducer assembly 300 proximally toward the steam pipe 200 so as to install the transducer assembly 300 to the steam line. An isolation valve 205 installed on the steam pipe 200 can provide an entrance into the pipe for the ultrasonic transducer 305. When closed, the isolation valve 205 can block access to the pipe 200 and prevent steam flowing through the steam line from exiting the same. When opened, the isolation valve 205 enables access to the pipe 200 through an open channel, into which the ultrasonic transducer 305 of the transducer assembly 300 is inserted.

The transducer assembly 300, in greater detail, can be installed into the exemplary existing steam pipe 200 shown in FIG. 1. The transducer assembly 300 can include an ultrasonic steam measurement device for the purpose of performing measurements of steam flowing through the pipe 200 in which the device is located. In one exemplary embodiment, the ultrasonic steam measurement device can be an ultrasonic transducer 305 capable of converting electrical signals into ultrasound, and transmitting and receiving ultrasonic signals to perform measurements such as determining flow rate, flow direction, fluid level, the presence of leaks or other abnormalities, and so forth, as is generally known in the art. For the purpose of simplification, the ultrasonic steam measurement device of the transducer assembly 300 will be referred to herein as ultrasonic transducer 305, though the ultrasonic steam measurement device is not limited thereto. It is further understood that the ultrasonic transducer 305 can be variously configured to feature, for example, a 180° head (shown in FIG. 2), a 90° head, or otherwise, depending on the preferred implementation.

Figure 2:
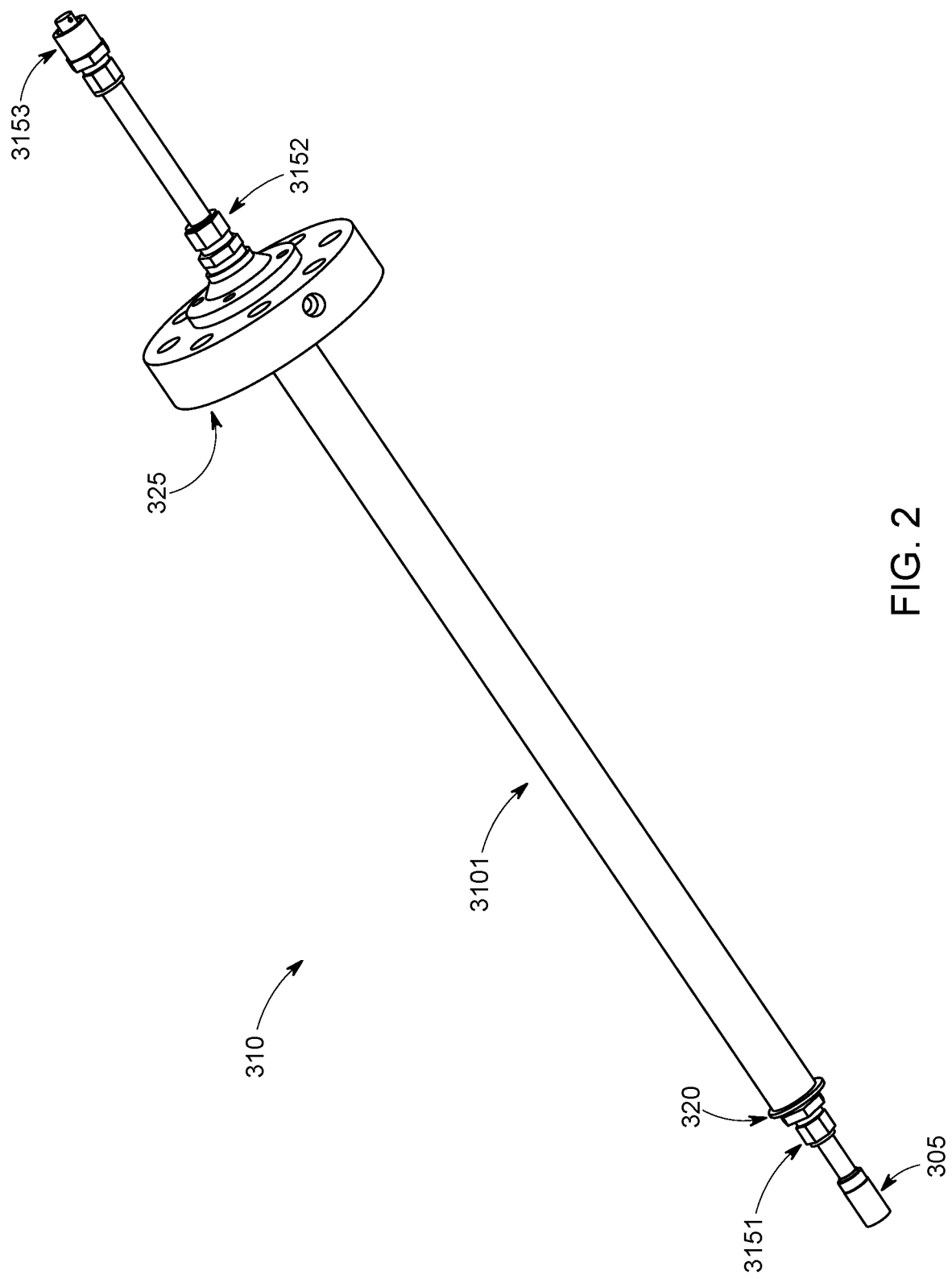
FIG. 2 is a perspective view of a barrel assembly housing the ultrasonic steam measurement device to be installed in the steam pipe shown in FIG. 1.

The transducer assembly 300 can include an elongated barrel assembly 310 housing the ultrasonic transducer 305. In this regard, FIG. 2 illustrates one embodiment of the barrel assembly 310 which can include a barrel 3101 within which the ultrasonic transducer 305 is disposed. The barrel 3101 can be a hollow shaft formed with openings at both ends thereof, and the length of the barrel 3101 can be less than that of the ultrasonic transducer 305. Thus, the ultrasonic transducer 305 can extend through the proximal opening of the barrel 3101 and through the distal opening of the barrel 3101, such that the barrel 3101 encloses a central portion of the ultrasonic transducer 305.

The barrel assembly 310 can include one or more compression tube fittings 315 to hold the ultrasonic transducer 305 in place within the barrel 3101. For instance, the barrel assembly 310 can include a first compression tube fitting 3151 disposed at a proximal end of the barrel 3101, and/or a second compression tube fitting 3152 disposed at a distal end of the barrel 3101. The compression tube fittings 315 can affix the barrel 3101 to the ultrasonic transducer 305 such that the barrel 3101 and the ultrasonic transducer 305 are translated in unison.

A third compression tube 3153 fitting can be installed on a distal end of the ultrasonic transducer 305, as shown in FIG. 2, at a location where a junction box (not shown) is installed after installation of the transducer assembly 300. The third compression tube fitting 3153 can allow the ultrasonic transducer 305 to be wired to the junction box so as to receive electronic signals for performing ultrasonic measurements of steam flowing in the pipe 200.

The barrel assembly 310 can further include a stop ring 320 disposed at or near a proximal end of the barrel 3101. In some cases, the stop ring 320 can be disposed immediately distal of the proximally located compression tube fitting 3151 mounted on the barrel 3101 (i.e., "first compression tube fitting"). Notably, high levels of pressure can build within an interior of the transducer assembly 300, capable of forcibly pushing the ultrasonic transducer 305 in the distal direction during extraction of the transducer 305. Thus, the stop ring 320 can act as a physical stop that prevents the proximal tip of the barrel assembly 310 from forcibly exiting the transducer assembly 300 in the distal direction (e.g., see FIG. 7), potentially causing harm to the operator.

The barrel assembly 310 can further include a barrel flange 325 disposed at or near a distal end of the barrel 3101. The barrel flange 325 can be welded or otherwise mounted onto the barrel 3101. In some cases, the barrel flange 325 can be disposed immediately proximal of the distally located compression tube fitting 3152 mounted on the barrel 3101 (i.e., "second compression tube fitting"). The barrel flange 325 can be circular, as shown in FIG. 2, with apertures formed therethrough to mate with the distal flange 340 of transducer assembly 300 having corresponding apertures formed therethrough. Fasteners, such as bolts, pins, or the like, can be used to attach the barrel flange 325 to the distal flange 340 of the transducer assembly 300, thereby holding the barrel assembly 310 and the ultrasonic transducer 305 therein in place.

Figure 3:
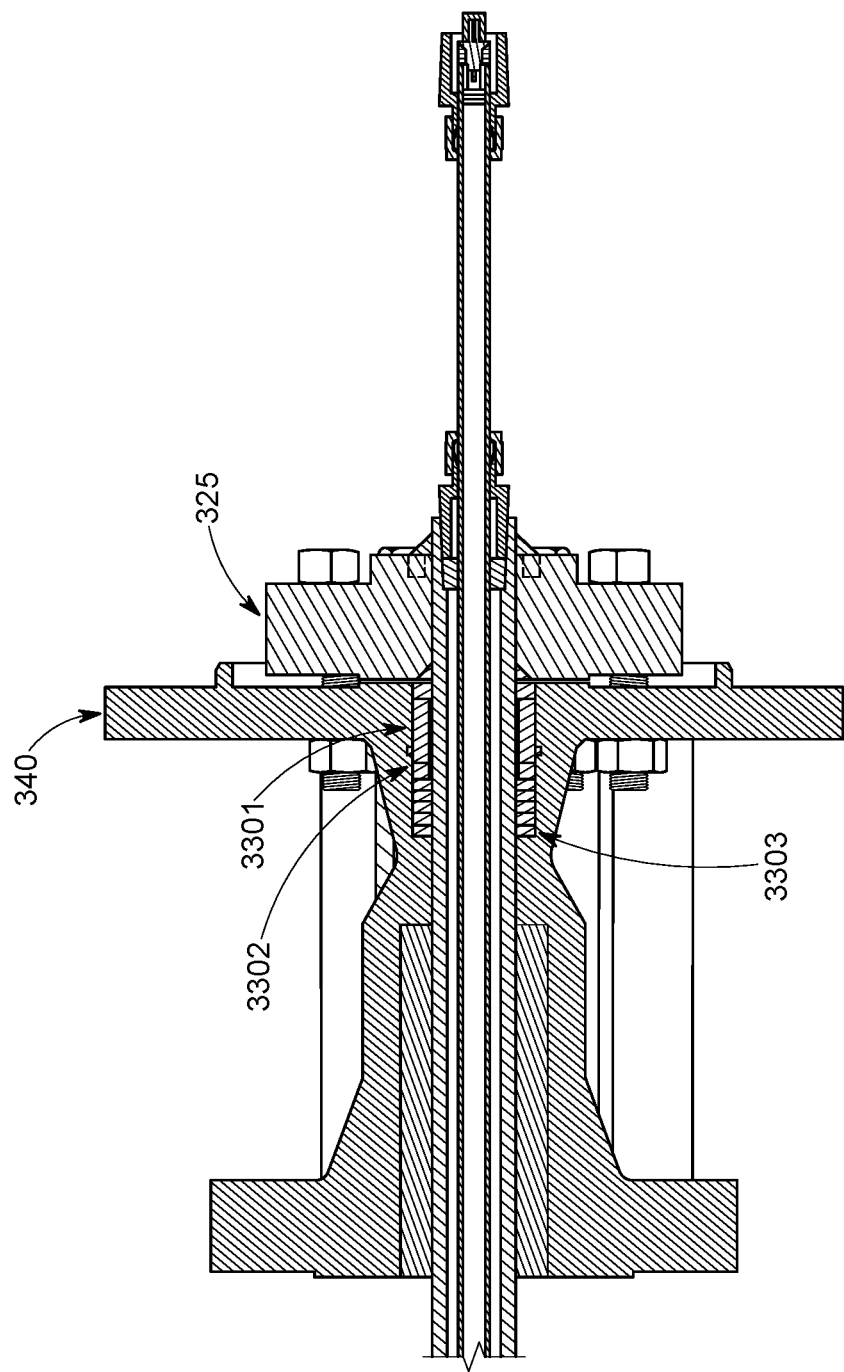
FIG. 3 is a cross-sectional side view of a packing gland assembly of the transducer assembly of the online installation system of FIG. 1.
Figure 4:
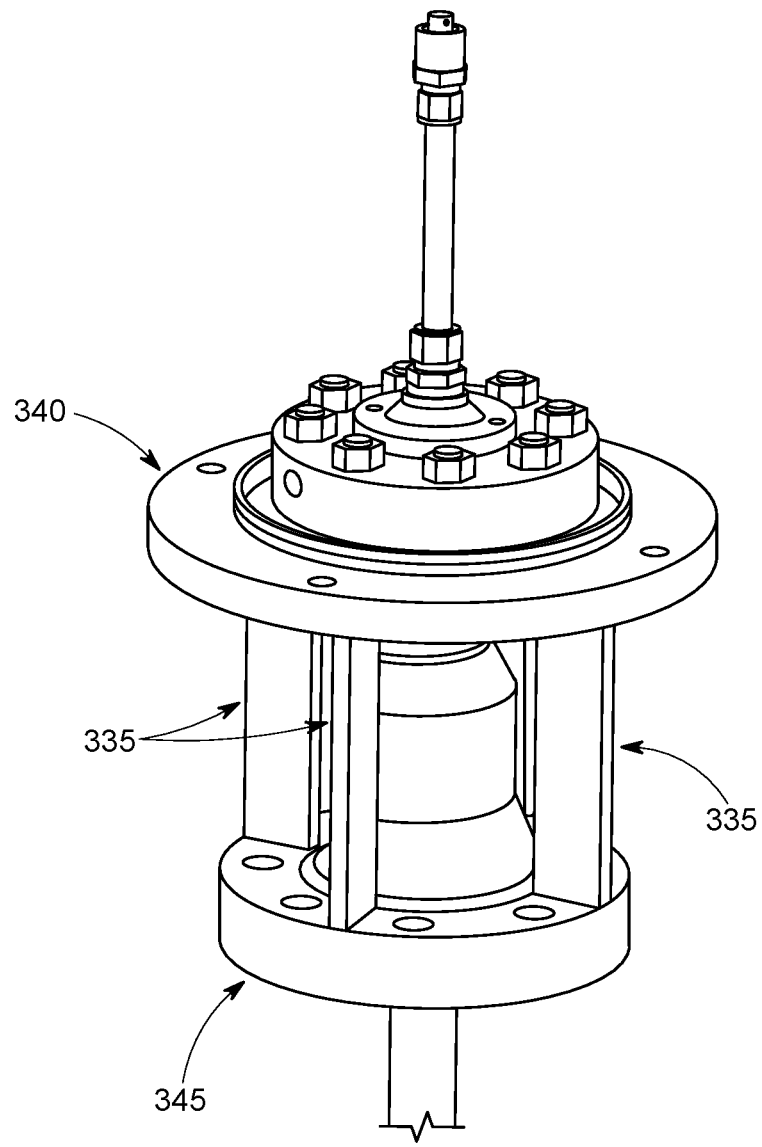
FIG. 4 is a perspective view of the transducer assembly of the online installation system of FIG. 1.

The barrel flange 325 can create the primary seal for the final assembly upon installation of the transducer assembly 300 into the steam pipe 200. Specifically, upon insertion of the ultrasonic transducer 305 into the steam line, the barrel flange 325 can be mounted to a distal flange 340 of transducer assembly 305, forming a seal therebetween, as shown in FIGS. 3 and 4. In this position, the barrel assembly 310 can be held in place within the transducer assembly 300, wherein the ultrasonic transducer 305 is operable to measure the flow characteristics of steam within the pipe 200. Thus, this position can represent a final assembly of the online installation system 100.

In the final assembly position, the barrel 3101 can create a dynamic seal with a packing gland of the transducer assembly 300. In this regard, FIG. 3 illustrates one embodiment of the packing gland assembly 330 that can compress packing material against the barrel shaft of the transducer assembly 300, thereby forming the dynamic seal against the barrel 3101. Therefore, the packing gland assembly 330 can provide a seal that prevents inadvertent release of steam from the steam line during insertion and retraction of the ultrasonic transducer 305.

As shown in FIG. 3, the packing gland assembly 330 can include, in order from distal to proximal, a packing nut 3301, a packing ring 3302, and packing material 3303. The packing nut 3301 can be mounted around the barrel 3101 and disposed between the outer surface of the barrel 3101 and an inner surface of the distal flange 340 of the transducer assembly 300. The packing nut 3301 can be, for example, a threaded nut configured to engage corresponding threads on the inner surface of the packing gland 330 and used to compress the packing material 3303. The packing ring 3302 can be disposed immediately proximal to the packing nut 3301 so as to abut the packing nut 3301. Like the packing nut 3301, the packing ring 3302 can be mounted around the barrel 3101 and disposed between the outer surface of the barrel 3101 and an inner surface of the distal flange 340 of the transducer assembly 300. The packing ring 3302 can be, for example, a metal spacer used to separate the packing material 3303 from the threaded area of the distal flange 340 of the packing gland. The packing material 3303 can be disposed immediately proximal to the packing ring 3302 so as to abut the packing ring 3302. The packing material 3303 can include, for example, graphite packing material that is disposed around the barrel 3101. The graphite packing material can be compressible such that a dynamic seal is created around the outer surface of the barrel 3101.

In order to axially reinforce the transducer assembly 300, a plurality of stiffening ribs 335 can be mounted within opposing flanges of the transducer assembly 300. In this regard, FIG. 4 illustrates one embodiment of stiffening ribs 335 that can extend from an inward-facing surface of the distal flange 340 of the transducer assembly 300 to an inward-facing surface of a proximal flange 345 of the transducer assembly 300. The stiffening ribs 335 can minimize deflection of the packing seal caused by linear actuation of the ultrasonic transducer 305 (demonstrated in FIGS. 7 and 8). The stiffening ribs 335 can also operate to prevent leakage of the packing seal, and to prevent buckling of the actuated barrel 3101.

As illustrated in FIG. 4, the proximal flange 345 of the transducer assembly 300 can be circular with apertures formed therethrough to mate with the distal flange 210 of the isolation valve 205 having corresponding apertures formed therethrough. Fasteners, such as bolts, pins, or the like, can be used to attach the proximal flange 345 of the transducer assembly 300 to the distal flange 210 of the isolation valve 205, thereby mounting the transducer assembly 300 to the isolation valve 205 and forming an air-tight seal therebetween (e.g., see FIG. 9).

Figure 8:
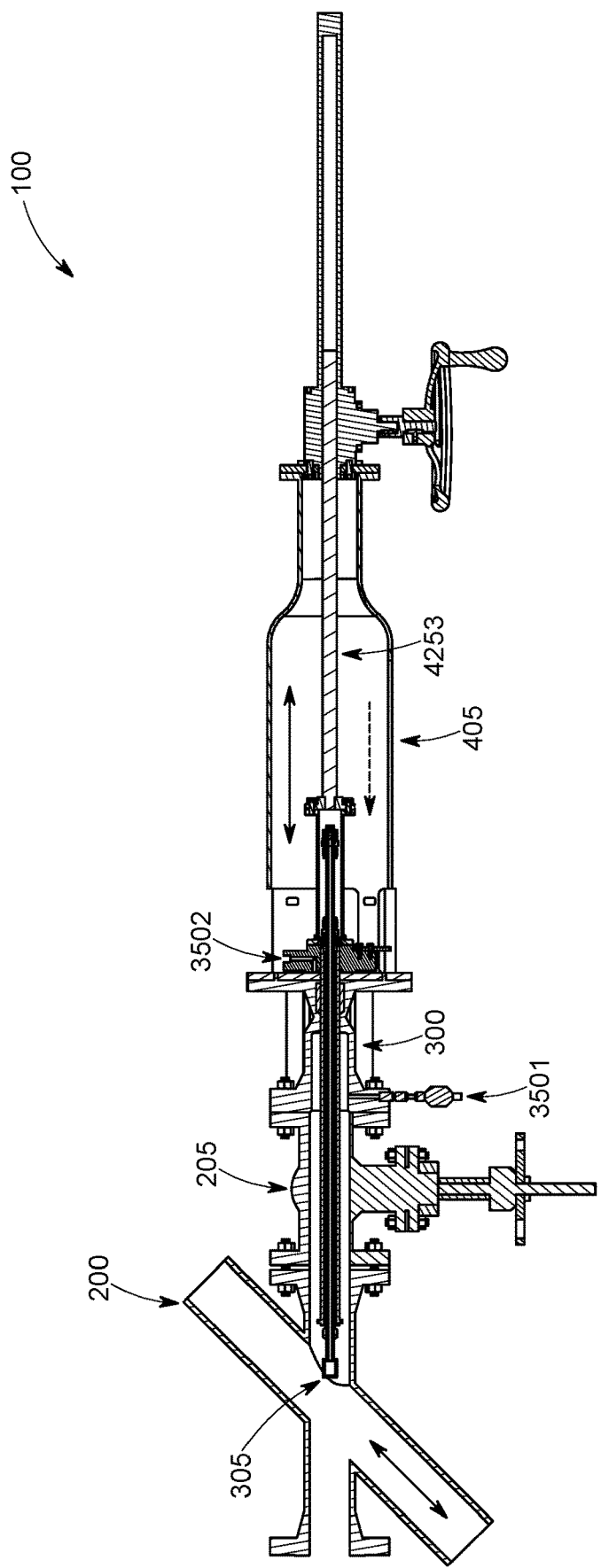
FIG. 8 is a cross-sectional side view of the online installation system of FIG. 1, showing the ultrasonic steam measurement device in an inserted position.

In addition, the transducer assembly 300 can include one or more bleed ports 350 for releasing pressure at certain points during operation of the online installation system 100. As an example, a first bleed port 3501 can be installed at the proximal flange of the transducer assembly 300, adjacent to the distal flange of the isolation valve, as shown in FIG. 8. The first bleed port 3501 can be utilized to release pressure that builds up in the packing gland assembly while the transducer assembly 300 is installed onto the steam pipe 200, so as to avoid components of the transducer assembly 300 being forcibly ejected when removing the transducer assembly 300 from the steam pipe 200. As another example, a second bleed port 3502 can be installed at the barrel flange 325, as shown in FIG. 8. As such, the second bleed port 3502 can be removed so that the barrel flange 325 can be displaced linearly as the ultrasonic transducer 305 is linearly actuated. Similar to the first bleed port 3501, the second bleed port 3502 can be utilized prior to removal of the transducer assembly 300 to release pressure that builds up in the transducer assembly 300 and leaks beyond the packing gland assembly 330 while the transducer assembly 300 is installed onto the steam pipe 200. The first and second bleed ports 3501, 3502 can remain closed during operation to avoid depressurizing the steam line.

Figure 6:
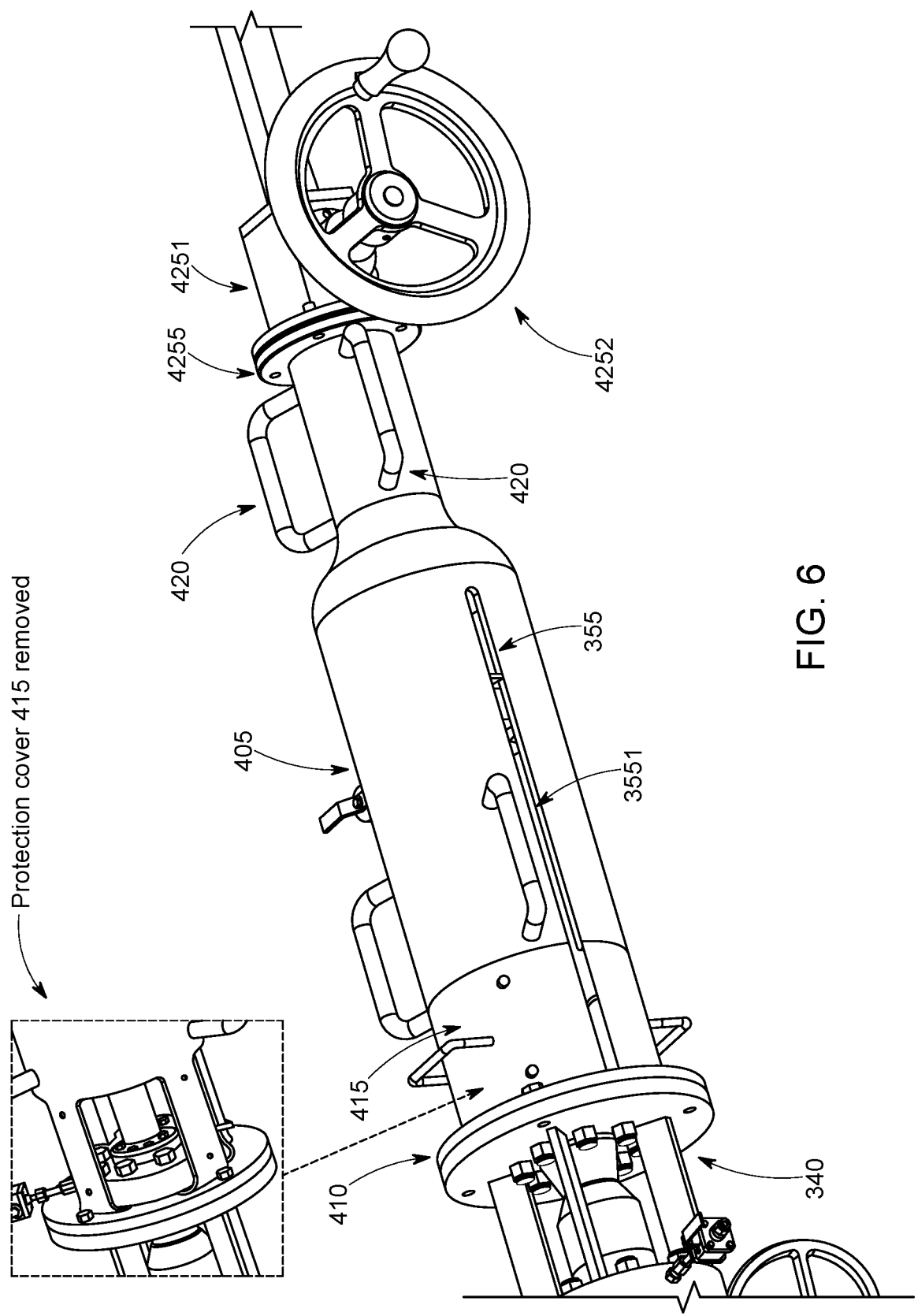
FIG. 6 is a perspective view of the insertion mechanism of FIG. 5.
Figure 7:
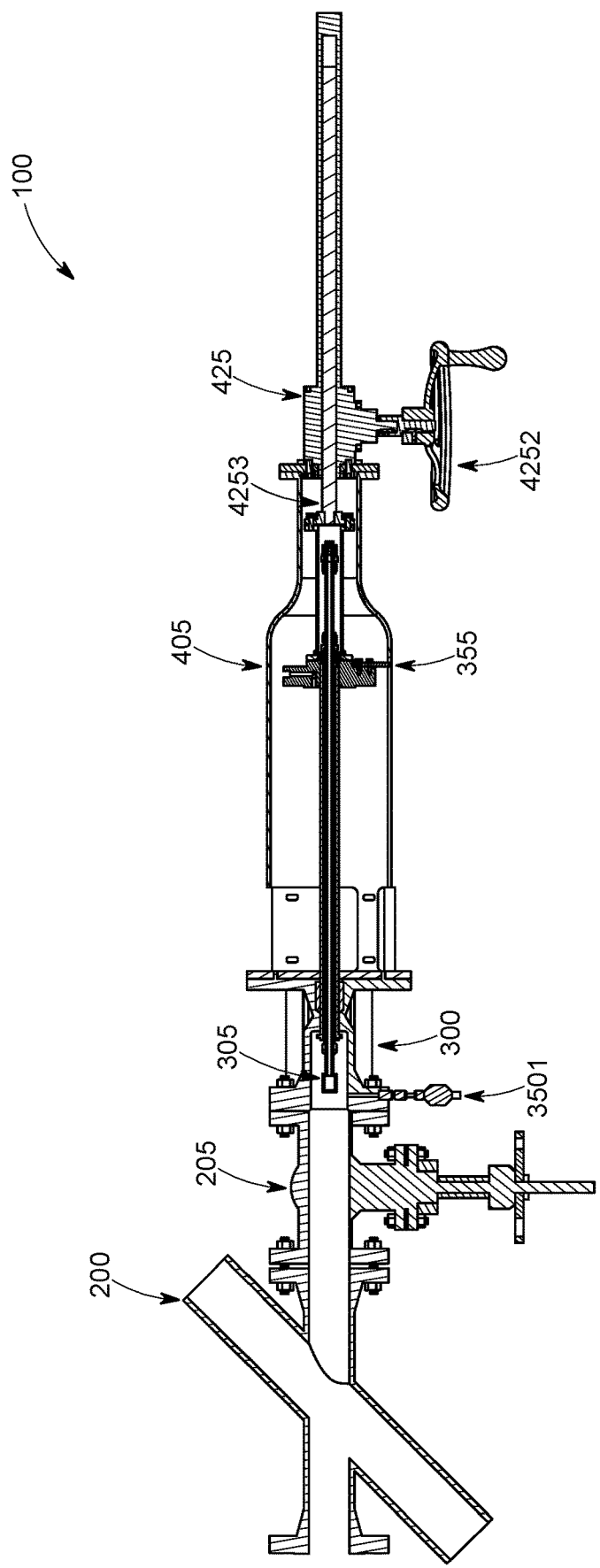
FIG. 7 is a cross-sectional side view of the online installation system of FIG. 1, showing the ultrasonic steam measurement device in a retracted position.

Furthermore, the transducer assembly 300 can include an indicator bar 355 disposed on the barrel flange 325, as shown in FIGS. 6 and 7. The indicator bar 355 can extend outwardly from the barrel flange 325 and through an indicator bar slot 3551 formed in the insertion mechanism housing 405 in an axial direction, as shown in FIG. 6. Because the indicator bar 355 can protrude through the indicator bar slot 3551 formed in the insertion mechanism housing 405, an operator can be aware of the position of the ultrasonic transducer 305 despite the barrel assembly 310 being substantially enclosed by the insertion mechanism housing 405. For instance, when the indicator bar 355 is proximally positioned, it can indicate that the ultrasonic transducer 305 is inserted in the steam line. When the indicator bar 355 is distally positioned, it can indicate that extraction of the ultrasonic transducer 305 is complete.

Referring again to FIG. 1, the online installation system 100 can include an insertion mechanism 400 configured to couple to a distal end of the transducer assembly 300 and control linear actuation of the ultrasonic transducer 305. The insertion mechanism 400, therefore, can be used to install and uninstall the transducer assembly 300.

Figure 5:
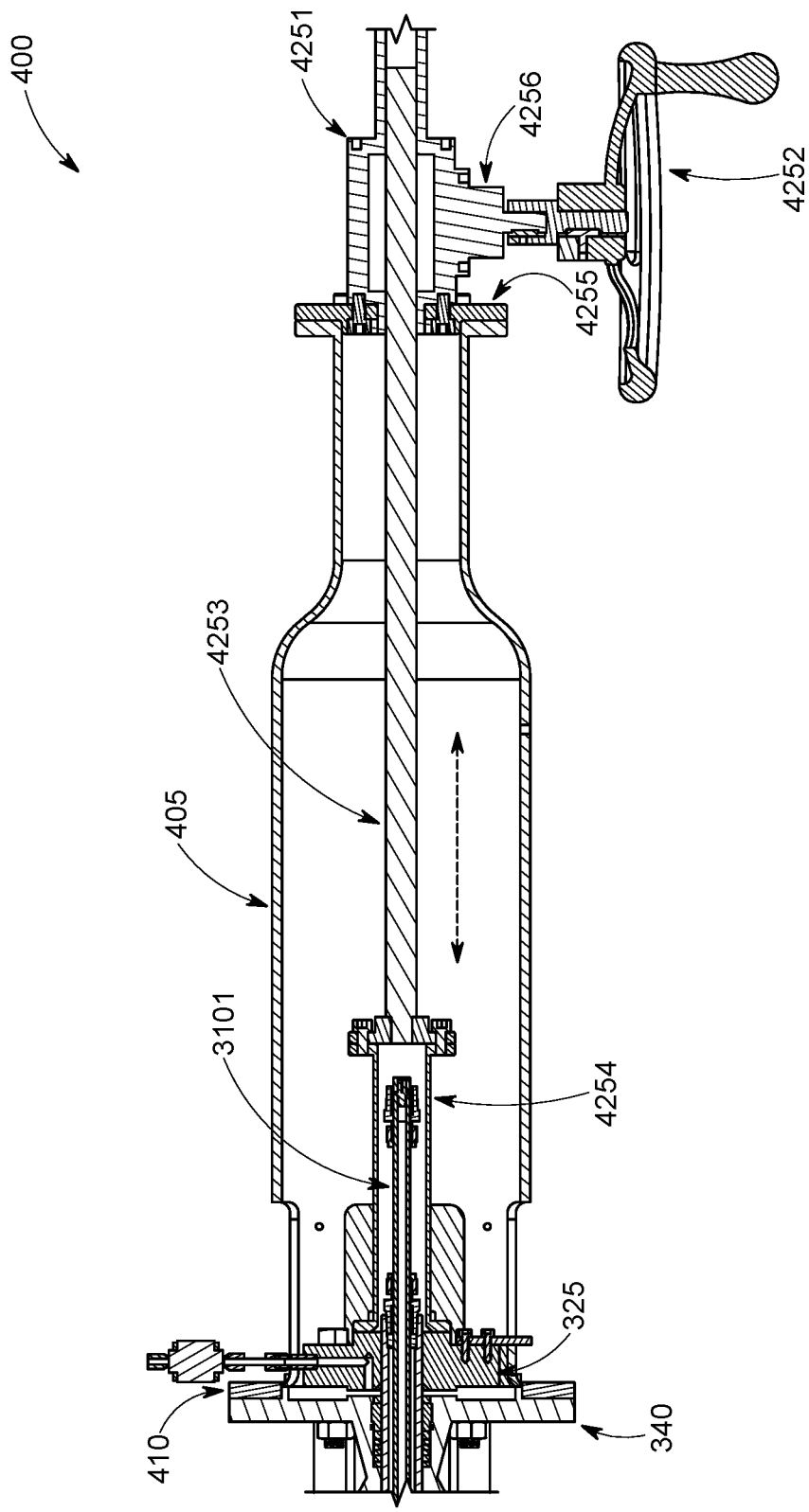
FIG. 5 is a cross-sectional side view of an insertion mechanism of the online installation system of FIG. 1.

In further detail, FIG. 5 illustrates one embodiment of the insertion mechanism 400 which can include an insertion mechanism housing 405 at least partially enclosing the barrel assembly 310. The insertion mechanism housing 405 can be cylindrically formed. The cylindrically-shaped insertion mechanism housing 405 can have a larger diameter at a proximal portion thereof, to accommodate the barrel flange 325 during actuation of the ultrasonic transducer 305, and can have a smaller diameter at a distal portion thereof, to prevent the barrel flange 325 from traversing distally within the insertion mechanism housing 405 beyond a point where the larger diameter tapers to the smaller diameter.

A proximal flange 410 can be disposed at a proximal end of the insertion mechanism housing 405 for mating with the distal flange 340 of the transducer assembly 300. In some embodiments, the proximal flange 410 of the insertion mechanism housing 405 can be circular, as shown in FIG. 6, with apertures formed therethrough to mate with the distal flange 340 of the transducer assembly 300 having corresponding apertures formed therethrough. Fasteners, such as bolts, pins, or the like, can be used to attach the proximal flange 410 of the insertion mechanism housing 405 to the distal flange 340 of the transducer assembly 300.

The insertion mechanism housing 405 can also include one or more removable protection covers 415, as shown in FIG. 6. The one or more removable protection covers 415 can be disposed at a proximal portion of the insertion mechanism housing 415 and can cover moving components inside the housing 405 during installation of the transducer assembly 300. The one or more covers 415 can be removed, as shown in the inset of FIG. 6, to allow an operator to complete installation of the transducer assembly 305 by mounting the barrel flange 325 to the distal flange 340 of the transducer assembly 300.

A plurality of handles 420 for lifting the online installation system 100 can be disposed along the outer surface of the insertion mechanism housing 405. The handles 420 can be utilized when positioning the insertion mechanism 400 for installation of the transducer assembly 305 to the steam pipe 200.

The insertion mechanism 400 can further include a linear actuator assembly 425 used for linearly actuating the barrel assembly 310. The linear actuator assembly 425 can include a linear actuator 4251 disposed distal of the insertion mechanism housing 405. FIGS. 5 and 6 illustrate one embodiment of the linear actuator assembly 425 in which the linear actuator assembly 425 is configured to mechanically actuate the barrel assembly 330. For example, the linear actuator 4251 can be driven by a lead screw or bevel screw jack assembly 4256. In this case, a hand-wheel 4252 can be used by the operator to manually drive the linear actuator 4251, overcoming any counter-acting forces resulting from pressure caused by steam and friction from the packing gland assembly 330. The lead screw or bevel screw jack assembly 4256 can translate the rotational forces delivered to the hand-wheel 4252 into linear motion of the barrel shaft to linearly actuate the barrel assembly 310. Alternatively, the linear actuator assembly 425 can be driven hydraulically, pneumatically, or electrically, in which case the lead screw and hand-wheel can be replaced with hydraulic-, pneumatic-, or electrical-specific components.

The linear actuator assembly 425 can include an elongate shaft 4253 extending axially inside of the insertion mechanism housing 405. The linear actuator shaft 4253 can extend distally through a distal opening of the insertion mechanism housing 405 and couple to the lead screw or bevel screw jack assembly 4256 of the mechanically-driven linear actuator 4251. A proximal end of the linear actuator shaft 4253 can couple to the barrel assembly 310 in which the ultrasonic transducer 305 is disposed. Thus, when the hand-wheel 4252 is turned, the linear actuator shaft 4253 is caused to translate linearly, thereby linearly actuating the barrel assembly 310 and ultrasonic transducer 305. The linear actuator assembly 425 can also include a barrel adapter tube 4254 that connects the proximal end of the linear actuator shaft 4253 to the distal end of the barrel assembly 310. The barrel adapter tube 4254 can at least partially enclose the distal portion of ultrasonic transducer 305 that extends distally beyond the barrel 3101.

In addition, the linear actuator assembly 425 can include an actuator adapter plate 4255 that connects the linear actuator 4251 to the insertion mechanism housing 405. The actuator adapter plate 4255 can be sandwiched between the insertion mechanism housing 405 and the linear actuator 4251, thereby coupling the linear actuator 4251 to the insertion mechanism housing 405, as shown in FIG. 5. The linear actuator shaft 4253 can extend distally through an opening in the actuator adapter plate 4255

The linear actuator assembly 425 can further include various safety mechanisms for preventing inadvertent or ill-timed linear actuation of the ultrasonic transducer 305. For instance, FIG. 10 illustrates one embodiment of the linear actuator assembly 425 including a locking mechanism 500 configured to prevent rotation of the hand-wheel 4252 in one direction, thereby preventing linear advancement of the linear actuator shaft 4253, barrel assembly 310, and ultrasonic transducer 305 in a corresponding direction.

Figure 10:
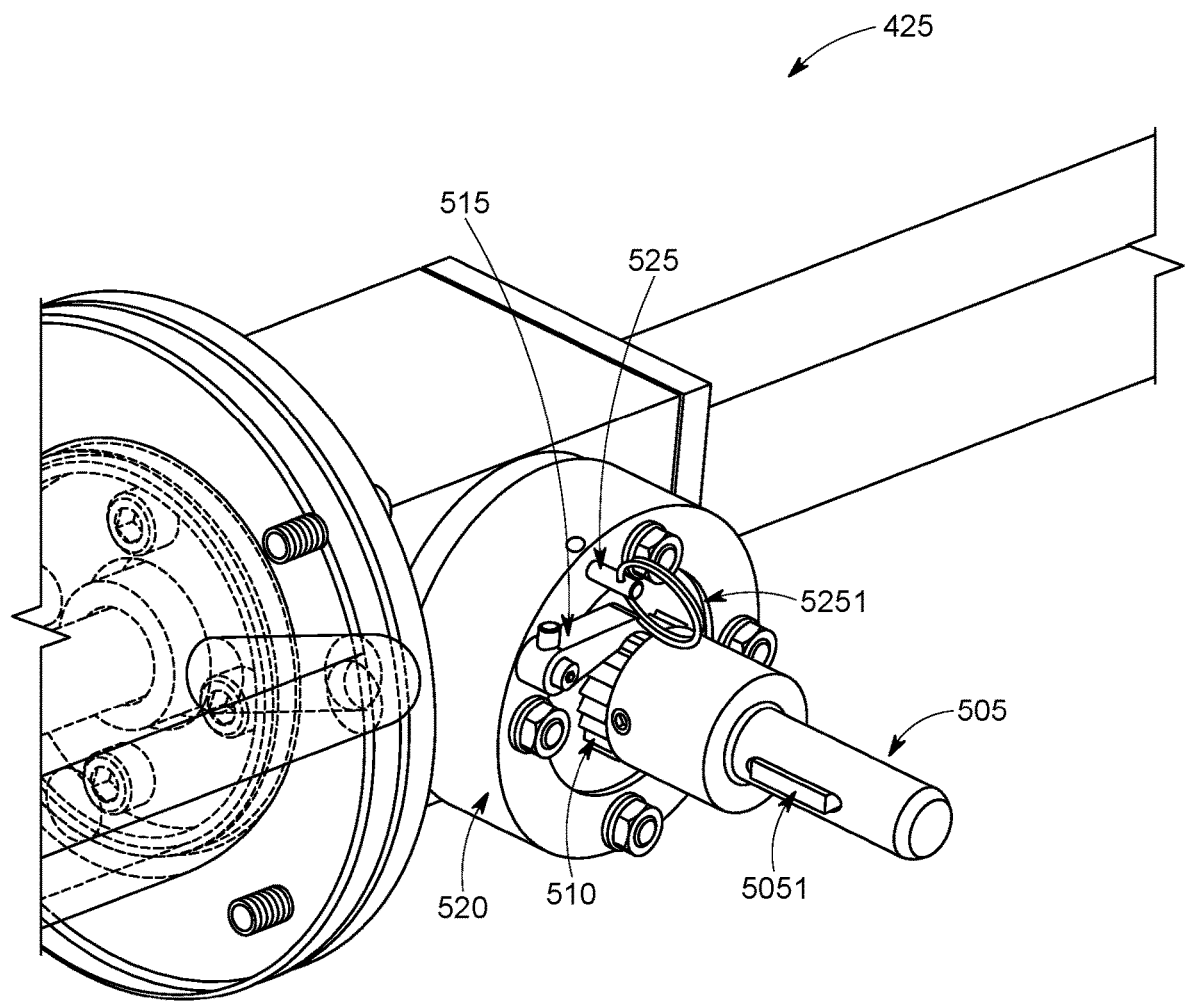
FIG. 10 is a perspective view of a linear actuator assembly of the insertion mechanism of FIG. 5.

As shown in FIG. 10, the locking mechanism 500 can include an elongated shaft coupler 505 extending outwardly from the linear actuator assembly 425. Portions of the shaft coupler 505 can be cylindrically shaped and configured to attach to the hand-wheel 4252, thereby connecting the hand-wheel 4252 to the drive shaft of the linear actuator assembly 425. (For demonstration purposes, the hand-wheel 4252 has been removed from view in FIG. 10.) In some embodiments, the shaft coupler 505 can be inserted onto an inner shaft 5052 and attached thereto. An elongated protrusion portion 5051 can be disposed on the outer surface of the shaft coupler 505 along an axial direction thereof. The protrusion portion 5051 can correspond to a receiving portion (not shown) hand-wheel 4252 in which the protrusion portion 5051 can be inserted, enabling the shaft coupler 505 to rotatably couple to the hand-wheel 4252. As a result, the shaft coupler 505 can be rotate in unison with the hand-wheel 4252.

The locking mechanism 500 can further include a ratcheting gear 510 disposed behind the shaft coupler 505. The ratcheting gear 510 can be attached to the inner shaft 5052 so as to rotation in unison with the shaft coupler 505 and the hand-wheel 4252. The ratcheting gear 510 can include a plurality of teeth 5101 configured to engage with a pawl 515 disposed adjacent to the ratcheting gear 510. The teeth 5101 of the ratcheting gear 510 can be disposed at an angle to permit rotation of the hand-wheel 4252 in one direction, while preventing the hand-wheel 4252 from rotating in the opposite direction due to the distal end of the pawl 515 abutting an inner wall of one of the teeth 5101.

The ratcheting gear 510 and shaft coupler 505 can be disposed at least partially inside of a cylindrically-shaped wheel lock collar 520. Fasteners, such as bolts, pins, or the like, can be used to mount the wheel lock collar 520 to the linear actuator assembly 425.

Additionally, the pawl 515 can be pivotably mounted to a portion of the wheel lock collar 520. As shown in FIG. 10, a proximal end of the pawl 515 can be mounted to an outer surface of the wheel lock collar 520, extending therefrom toward the ratcheting gear 510 such that the distal end of the pawl 515 can engage with the teeth 5101 of the ratcheting gear 510. The pawl 515 can be mounted to the wheel lock collar 520 in such a manner that the pawl 515 is capable of pivoting or rotating about a pivot point 5151. In some embodiments, the pawl 515 can be spring-loaded (e.g., with a shoulder screw) so the pawl 515 is inclined to return to a position in engagement with the ratcheting gear 510. Further, a dowel 5152 can be disposed so as to protrude from a proximal surface of the pawl 515 to provide a surface on which a user can manually rotate the pawl 515, thus retracting the pawl 515 from the ratcheting gear 510, as described in greater detail below.

The locking mechanism 500 can further include a quick-release pin 525 disposed on the wheel lock collar 520 at a position at least partially above the pawl 515. The quick-release pin 525 can move linearly along the axial direction of the wheel lock collar 520. In some embodiments, a ring 5251 can be disposed at a proximal end of the quick-release pin 525 to enable a user to pull the quick-release pin 525 from its position in the wheel lock collar 520. As described in greater detail below, the quick-release pin 525 can be positioned so as to come into contact with the distal end of the pawl 515 and, in some cases, hold the pawl 515 in a disengaged position to enable the hand-wheel 4252 to rotate freely.

Figure 11:
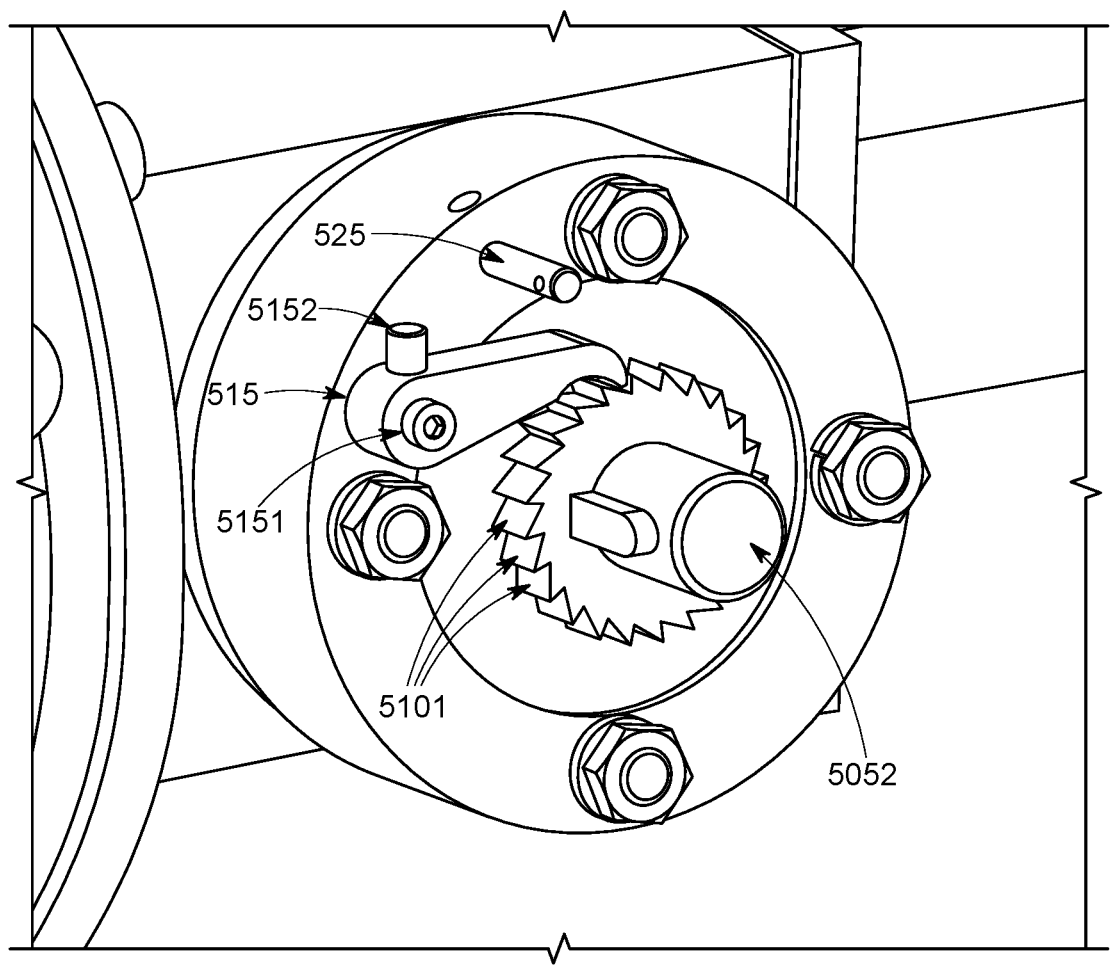
FIG. 11 is a perspective view of the linear actuator assembly of FIG. 10 in an engaged position.
Figure 12:
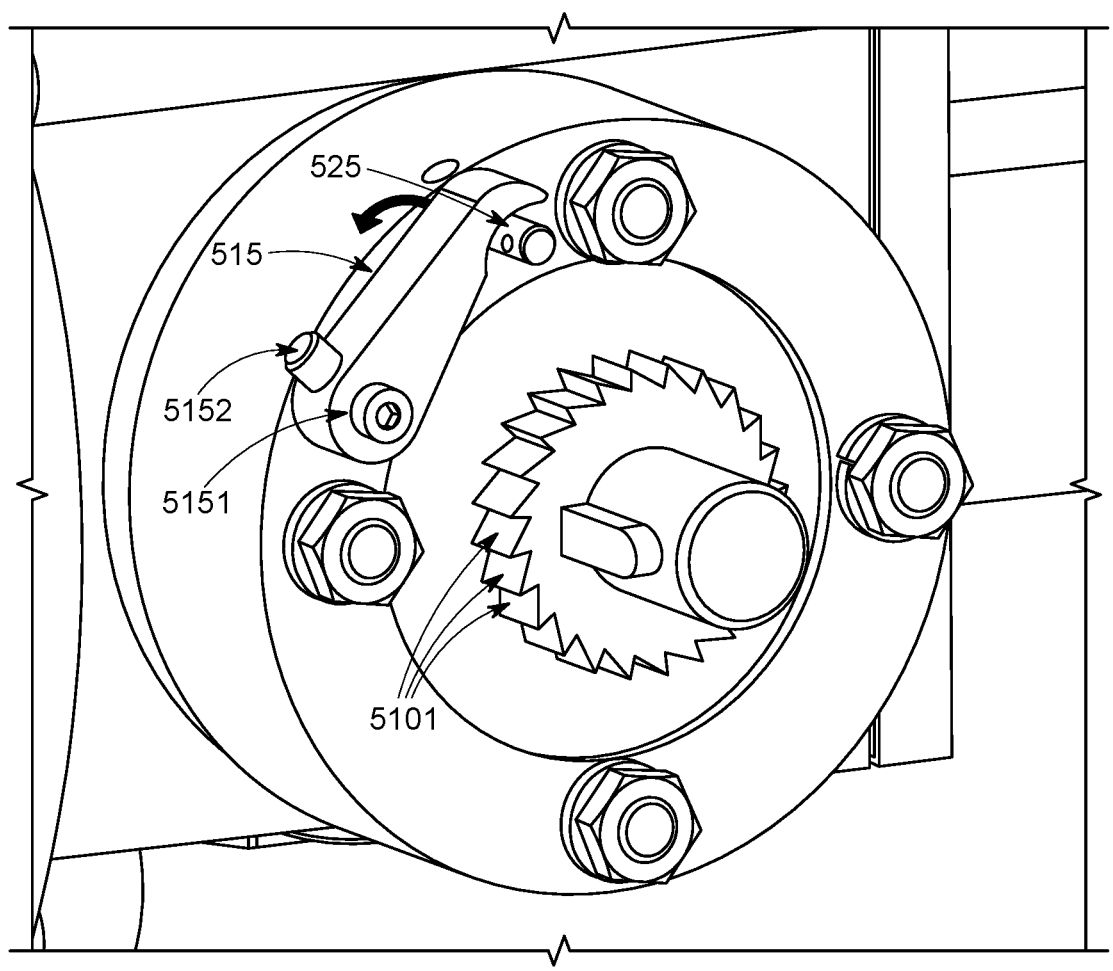
FIG. 12 is a perspective view of the linear actuator assembly of FIG. 10 in a disengaged position.

FIG. 11 illustrates one embodiment of the locking mechanism 500 in an engaged position, in which the linear actuator 4251 is locked in one direction, and FIG. 12 illustrates one embodiment of the locking mechanism 500 in a disengaged position, in which the linear actuator 4251 is free to move in either direction. (For demonstration purposes, the hand-wheel 4252, shaft coupler 505, and ring 5251 have been removed from view in FIGS. 11 and 12.)

As shown in FIG. 11, when the pawl 515 has rotated in a clockwise direction so as to contact the teeth 5101 of the ratcheting gear 510, the locking mechanism 500 can be considered to be in an engaged position, as the pawl 515 is engaged with the ratcheting gear 510. Here, the distal end of the pawl 515 can abut the inner wall of one of the teeth 5101, thereby preventing rotation of the ratcheting gear 510, and by extension, the shaft coupler 505 and the hand-wheel 4252. Consequently, linear advancement of the ultrasonic transducer 305 caused by rotation of the hand-wheel 4252 in the blocked direction is also blocked.

In one embodiment, the ratcheting gear 510 and pawl 515 can be arranged such that distal linear advancement (i.e., toward steam pipe 200) of the ultrasonic transducer 305 is blocked when the locking mechanism 500 is in the engaged position. This arrangement can be useful to prevent retreatment of the ultrasonic transducer 305 in certain situations, such as when an operator is nearby. In other embodiments, the ratcheting gear 510 and pawl 515 can be arranged in the opposite manner to block proximal linear advancement (i.e., toward steam pipe 200) of the ultrasonic transducer 305 when the locking mechanism 500 is in the engaged position.

As shown in FIG. 12, the pawl 515 can be manually rotated in the counterclockwise direction (e.g., by pushing on the dowel 5152) so as to disengage from the ratcheting gear 510. In order for the safety mechanism 500 to reach the disengaged position, the user can pull the quick-release pin 525 out of the wheel lock collar 520, and then rotate the pawl 515 beyond the position at which the wheel lock collar 520 receives the quick-release pin 525. Once the pawl 515 has been rotated beyond said position, the quick-release pin 525 can be reinserted into the wheel lock collar 520. In this position, the quick-release pin 525 can block the pawl 515 from rotating in the clockwise position, thereby separating the pawl 515 from the ratcheting gear 510 and placing the safety mechanism 500 in the disengaged position, as shown in FIG. 12. Here, the hand-wheel 4252 can rotate freely in either direction, and likewise, the ultrasonic transducer 305 can be linearly advanced either distally or proximally.

It is to be understood that while specific directions (e.g., clockwise, counterclockwise, distal, proximal, etc.) are mentioned above, the safety mechanism 500 can be modified in any manner suitable for selectively preventing actuation of the linear actuator assembly 425. It is to be understood that the safety mechanism 500 can be implemented with various types of linear actuator assemblies comprising hydraulic components, pneumatic components, electric components, or the like.

Referring next to FIG. 7, one embodiment of the online installation system 100 is illustrated in which the ultrasonic transducer 305 is in an initial, or retracted, position. In this position, the isolation valve 205 can be closed, and the ultrasonic transducer 305 can be positioned distal of the valve 205. Rotational forces exerted on the hand-wheel 4252 can be translated by the lead screw or bevel screw jack assembly into linear translation of the linear actuator shaft 4253, thereby translating the barrel 3101 assembly proximally (toward the steam pipe 200) or distally (away from the steam pipe 200). When installing the transducer assembly 300 to the steam pipe 200, the linear actuator 425 can be manipulated to linearly actuate the barrel assembly 310 proximally toward the steam pipe 200.

FIG. 8 illustrates one embodiment of the online installation system 100 in which the ultrasonic transducer 305 is in an inserted position. In this position, the isolation valve 205 can be open, and the barrel assembly 310 can be linearly translated proximally past the gate of the isolation valve 205 such that the tip of the ultrasonic transducer 305 is located in the steam pipe 200.

Figure 9:
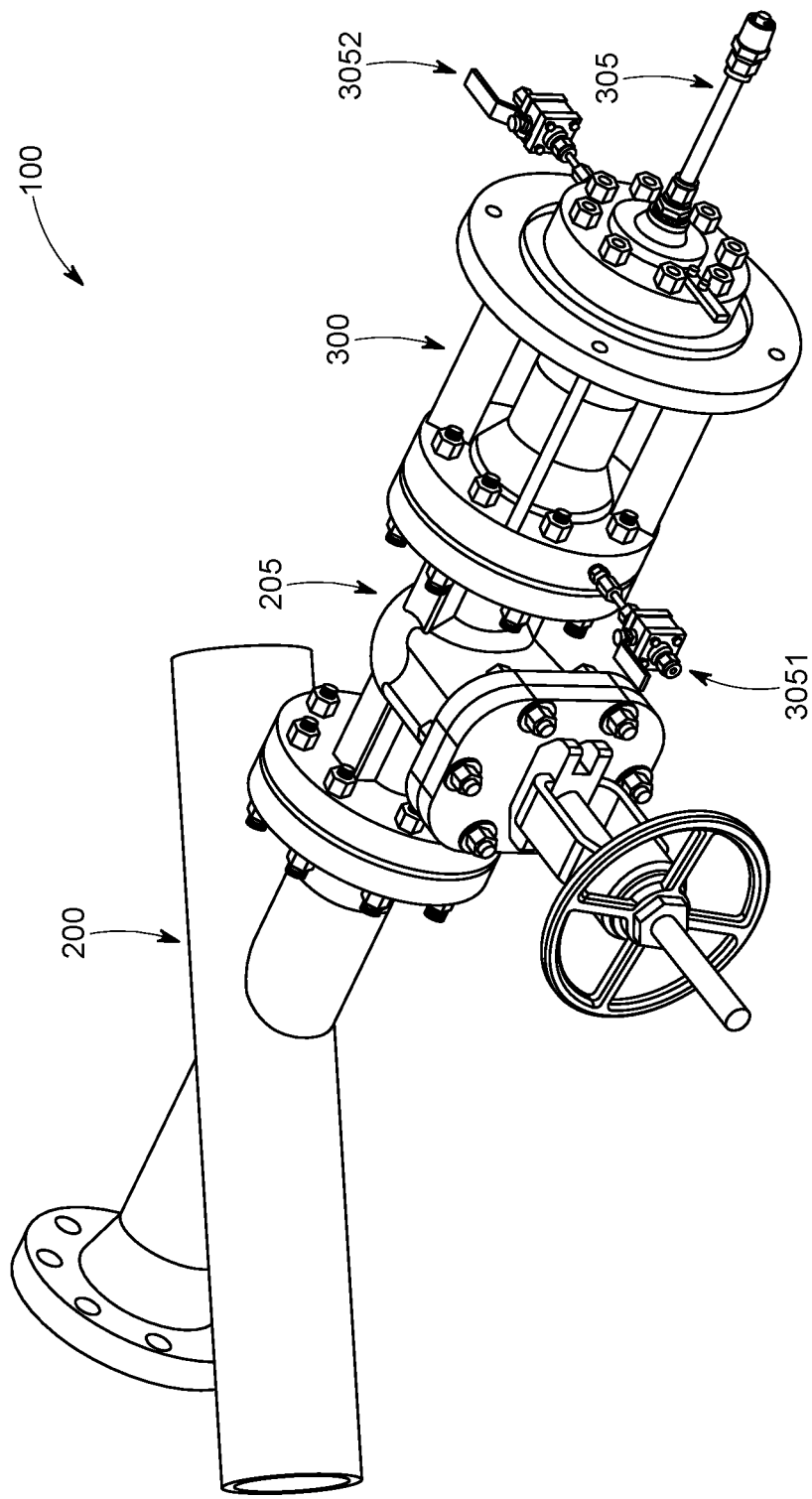
FIG. 9 is a perspective view of the online installation system of FIG. 1 after removal of the insertion mechanism of FIG. 5.

After installation of the transducer assembly 305 in the live steam line, the insertion mechanism 400 can be removed from a distal end of the transducer assembly, as shown in FIG. 9. At this point, installation of the system 100 can be considered completed, and the ultrasonic transducer 305 can continue to take measurements of steam characteristics inside of the pipe 200. The insertion mechanism 400 can be re-used to install another transducer assembly onto a different pipe, if desired.

Accordingly, the online installation system as discussed herein provides for online installations of ultrasonic steam measurement devices in live steam pipes, without the need to interrupt or shut down the line, as opposed to current techniques which can require either the steam line to be shut down and disassembled in order to reduce the pressure and install the flowmeter, or the flowmeter to be integrated into the steam line at the time that the steam line is initially built. Thus, steam measurement devices can be introduced into a steam line retroactively without needing to empty the pipe or otherwise interrupt its operation. Moreover, after installing the transducer assembly, the insertion mechanism can be re-used to perform a new transducer installation.

While there have been shown and described illustrative embodiments that provide for online installations of ultrasonic steam measurement devices in steam pipes, it is to be understood that various other adaptations and modifications may be made within the spirit and scope of the embodiments herein. For example, the embodiments have been primarily shown and described herein with relation to steam-carrying pipes. However, the embodiments in their broader sense are not as limited. Rather, the devices and techniques described herein may be applied to vessels carrying other forms of pressurized fluids, as well. Moreover, the device and techniques described herein may be applied to steam measurement devices other than ultrasound-based measurement devices. Thus, the embodiments may be modified in any suitable manner in accordance with the scope of the present claims.

It should be understood that terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "includes," or variations thereof, when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An ultrasonic steam measurement system, comprising:
a transducer assembly configured to be coupled to a distal end of an isolation valve installed on a pressurized steam pipe, the transducer assembly including a barrel assembly including an elongated barrel and a barrel flange disposed at or near a distal end of the barrel and extending outwardly from the elongated barrel;
an ultrasonic transducer movably disposed within the transducer assembly, the ultrasonic transducer extending through a proximal opening of the transducer assembly and extending through a distal opening of the transducer assembly, wherein the elongated barrel of the barrel assembly surrounds at least a portion of the ultrasonic transducer; and
an insertion mechanism configured to be coupled to a distal end of the transducer assembly and having a cylindrical insertion mechanism housing at least partially enclosing the ultrasonic transducer, the insertion mechanism including a linear actuator assembly configured to linearly actuate the ultrasonic transducer, wherein after linear actuation of a portion of the ultrasonic transducer into the pressurized steam pipe, the barrel flange is configured to be attached to a distal flange of the transducer assembly, thereby holding the barrel assembly in place within the transducer assembly.

2. The ultrasonic steam measurement system of claim 1, wherein the linear actuator assembly is configured to linearly actuate a portion of the ultrasonic transducer through an opening in the isolation valve and into the pressurized steam pipe.

3. The ultrasonic steam measurement system of claim 1, wherein the linear actuator assembly is configured to linearly actuate the ultrasonic transducer into the pressurized steam pipe without depressurizing the pressurized steam pipe.

4. The ultrasonic steam measurement system of claim 1, wherein, after linear actuation of a portion of the ultrasonic transducer into the pressurized steam pipe, the insertion mechanism is configured to be decoupled from the transducer assembly while the portion of the ultrasonic transducer remains disposed inside of the pressurized steam pipe.

5. The ultrasonic steam measurement system of claim 1, wherein the barrel assembly further includes one or more compression tube fittings configured to hold the ultrasonic transducer in place within the barrel.

6. The ultrasonic steam measurement system of claim 1, wherein the transducer assembly further includes a proximal flange configured to attach to a distal flange of the isolation valve.

7. The ultrasonic steam measurement system of claim 1, wherein the transducer assembly includes a packing gland assembly configured to compress packing material against the barrel to form a seal against the barrel.

8. The ultrasonic steam measurement system of claim 7, wherein the packing gland assembly includes a packing nut mounted around the barrel, a packing ring disposed proximal to and in contact with the packing nut, and the packing material which is disposed around the barrel.

9. The ultrasonic steam measurement system of claim 1, wherein the transducer assembly includes a plurality of stiffening ribs mounted within proximal and distal flanges of the transducer assembly, the plurality of stiffening ribs configured to axially reinforce the transducer assembly.

10. The ultrasonic steam measurement system of claim 1, wherein the transducer assembly includes an indicator bar configured to indicate a position of the ultrasonic transducer.

11. The ultrasonic steam measurement system of claim 1, wherein the insertion mechanism housing includes a first portion having a first diameter and a second portion having a second diameter that is smaller than the first diameter.

12. The ultrasonic steam measurement system of claim 1, wherein the first portion of the insertion mechanism housing is configured to accommodate a barrel flange of the transducer assembly, the second portion of the insertion mechanism housing is configured to be unable to accommodate the barrel flange of the transducer assembly.

13. The ultrasonic steam measurement system of claim 1, wherein the insertion mechanism includes a proximal flange disposed at a proximal end of the insertion mechanism housing, the proximal flange configured to attach to a distal flange of the transducer assembly.

14. The ultrasonic steam measurement system of claim 1, wherein the linear actuator assembly includes a hand-wheel, the linear actuator assembly configured to translate rotation of the hand-wheel to linear actuation of the ultrasonic transducer.

15. The ultrasonic steam measurement system of claim 14, wherein the linear actuator assembly includes a locking mechanism configured to prevent rotation of the hand-wheel in one direction.

16. The ultrasonic steam measurement system of claim 15, wherein the locking mechanism includes a ratcheting gear having a plurality of angular teeth and a pawl configured to pivot about a mounting point.

17. The ultrasonic steam measurement system of claim 16, wherein, when the pawl engages with one or more of the plurality of angular teeth, rotation of the hand-wheel in one direction is prevented, and when the pawl disengages with the plurality of angular teeth, rotation of the hand-wheel in any direction is enabled.

* * * * *